US008862597B2

(12) United States Patent
Barak et al.

(10) Patent No.: US 8,862,597 B2
(45) Date of Patent: Oct. 14, 2014

(54) PROVIDING CONTEXTUALLY-RELEVANT CONTENT

(75) Inventors: Nimrod Barak, Tel Aviv (IL); Stav Grinshpon, Petach Tikva (IL)

(73) Assignee: SAP Portals Israel Ltd, Ra'anana (IL)

( * ) Notice: Subject to any disclaimer, the term of this patent is extended or adjusted under 35 U.S.C. 154(b) by 163 days.

(21) Appl. No.: 13/337,485

(22) Filed: Dec. 27, 2011

(65) Prior Publication Data
US 2013/0166577 A1   Jun. 27, 2013

(51) Int. Cl.
*G06F 17/30* (2006.01)
(52) U.S. Cl.
USPC .......................................... 707/754; 707/741
(58) Field of Classification Search
USPC ................. 707/754, 736, 999.001, 999.002, 707/999.003, 741
See application file for complete search history.

(56) References Cited

U.S. PATENT DOCUMENTS

| 6,327,590 | B1 * | 12/2001 | Chidlovskii et al. .......... 707/734 |
| 2002/0078045 | A1 | 6/2002 | Dutta |
| 2003/0131000 | A1 * | 7/2003 | Bates et al. ....................... 707/7 |
| 2004/0143667 | A1 * | 7/2004 | Jerome .......................... 709/228 |
| 2004/0205065 | A1 * | 10/2004 | Petras et al. ....................... 707/5 |
| 2005/0071328 | A1 * | 3/2005 | Lawrence .......................... 707/3 |
| 2006/0195442 | A1 | 8/2006 | Cone et al. |
| 2007/0124701 | A1 * | 5/2007 | Gong et al. .................. 715/854 |
| 2007/0233671 | A1 * | 10/2007 | Oztekin et al. .................... 707/5 |
| 2008/0065600 | A1 | 3/2008 | Batteram et al. |

OTHER PUBLICATIONS

EPO Extended Search Report, Application No. 12007598.1-1527, 6 pages, mailed Feb. 1, 2013.

* cited by examiner

*Primary Examiner* — Shiow-Jy Fan
(74) *Attorney, Agent, or Firm* — Fish & Richardson P.C.

(57) ABSTRACT

Techniques for providing contextually-relevant content include identifying content items accessed through a portal by a plurality of users, each user associated with one or more roles of a plurality of roles within the portal; updating a trace log to include information associated with the identified content, the information including associations between each identified content item and the role accessing each identified content item; receiving, from a user associated with a particular role of the plurality of roles, a search query through the portal for one or more content items; determining a plurality of search results responsive to the search query, the search results relating to the content items; for the particular role, filtering the plurality of search results based on the trace log; and generating a plurality of filtered search results for presentation through the portal.

29 Claims, 7 Drawing Sheets

PROVIDING CONTEXTUALLY-RELEVANT CONTENT

TECHNICAL BACKGROUND

This disclosure relates to searching contextually-relevant content and, more particularly, providing contextually-relevant content through a portal.

BACKGROUND

Business users of software in a business enterprise may access a virtual workspace through a portal to browse, view, modify, and/or otherwise manipulate data related to the business enterprise. Such data may include a variety of information in many different forms, such as sales data, revenue data, human resources information, business hierarchy information, and otherwise. Graphs, tables, charts, electronic communications, web services, reports, and other forms of data, may be viewable in the user's workspace. The workspace may allow or facilitate the resolution of business issues and/or problems by the user. In some instances, business users may access the virtual workspace (or other workspace, website, or other content) through the portal from a mobile device (e.g., smartphone, PDA, tablet, cell phone, or other mobile communication device). In some instances, for example when the portal exposes large amounts of web content, navigation of the web content can be problematic.

SUMMARY

This disclosure describes systems, methods, apparatus, and computer-readable media for providing contextually-relevant content based on a role of a user requesting the content thru a portal. Two or more users of the portal can have one or more associated roles. The roles can relate to job-specific functions of the user. When the users navigate the portal accessing multiple, differing types of content, a trace log is updated. The trace log includes the user's content navigational history. When a user having a specific role requests the content, the results can be filtered in view of the trace log for one or more specific roles.

A general embodiment of the subject matter described in this specification can be implemented in methods that include the actions of identifying content items accessed through a portal by a plurality of users, each user associated with one or more roles of a plurality of roles within the portal; updating a trace log to include information associated with the identified content, the information including associations between each identified content item and the role accessing each identified content item; receiving, from a user associated with a particular role of the plurality of roles, a search query through the portal for one or more content items; determining a plurality of search results responsive to the search query, the search results relating to the content items; for the particular role, filtering the plurality of search results based on the trace log; and generating a plurality of filtered search results for presentation through the portal.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In a first aspect combinable with any of the general embodiments, filtering the plurality of search results based on the trace log includes filtering the plurality of search results to include content items associated with the particular role.

In a second aspect combinable with any of the previous aspects, the search results only include content items associated with the particular role.

In a third aspect combinable with any of the previous aspects, at least two users of the plurality of users are associated with at least one same role.

In a fourth aspect combinable with any of the previous aspects, the role includes an employment role of the user.

In a fifth aspect combinable with any of the previous aspects, updating the trace log further includes storing the trace log in a directory, a database, or both.

A sixth aspect combinable with any of the previous aspects includes indexing the trace log based on one or more differing criteria.

In a seventh aspect combinable with any of the previous aspects, indexing the trace log further includes indexing the trace log based on one or more of a type of the content items, a number of times the content items are accessed, a most recent access of the content items, or a duration of the access of the content items.

In an eighth aspect combinable with any of the previous aspects, determining, based on indexing the trace log, a ranking score for each content item that is accessed by users associated with the particular role.

In a ninth aspect combinable with any of the previous aspects, generating the plurality of filtered results further includes ranking the filtered search results based on the ranking scores of the content items associated with the results.

A tenth aspect combinable with any of the previous aspects includes determining, based on indexing the trace log, a ranking score for each content item that is accessed by users associated with the particular role.

An eleventh aspect combinable with any of the previous aspects includes providing a subset of the content items including a ranking score above a threshold.

A twelfth aspect combinable with any of the previous aspects includes determining, based on indexing the trace log, a ranking score for each content item that is accessed by users associated with the particular role.

A thirteenth aspect combinable with any of the previous aspects includes determining a number of shared roles between two users of the plurality of users.

In a fourteenth aspect combinable with any of the previous aspects, altering the ranking score based on the number of shared roles.

In a fifteenth aspect combinable with any of the previous aspects, the search query is received through the portal from a mobile communication device.

Various embodiments of a contextually-relevant content filter module according to the present disclosure may have one or more of the following features. For example, the contextually-relevant content filter helps to focus on data relevant to users—such as employees, customers, partners, and suppliers—at any given time. Also, the user can be updated regarding content that other similar role users are accessing without intervention by a content administrator, but rather are updated based on suggestions and search insights provided by the contextually-relevant content filter.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DETAILED DESCRIPTION

This specification describes systems, methods, apparatus, and computer-readable media for providing contextually-relevant content based on a role of a user requesting the content thru a portal. Two or more users of the portal can have one or more associated roles. The roles can relate to job-specific functions of the user. When the users navigate the portal accessing multiple, differing types of content, a trace log is updated. The trace log includes the user's content navigational history. When a user having a specific role requests the content, the results can be filtered in view of the trace log for one or more specific roles.

Figure 1:
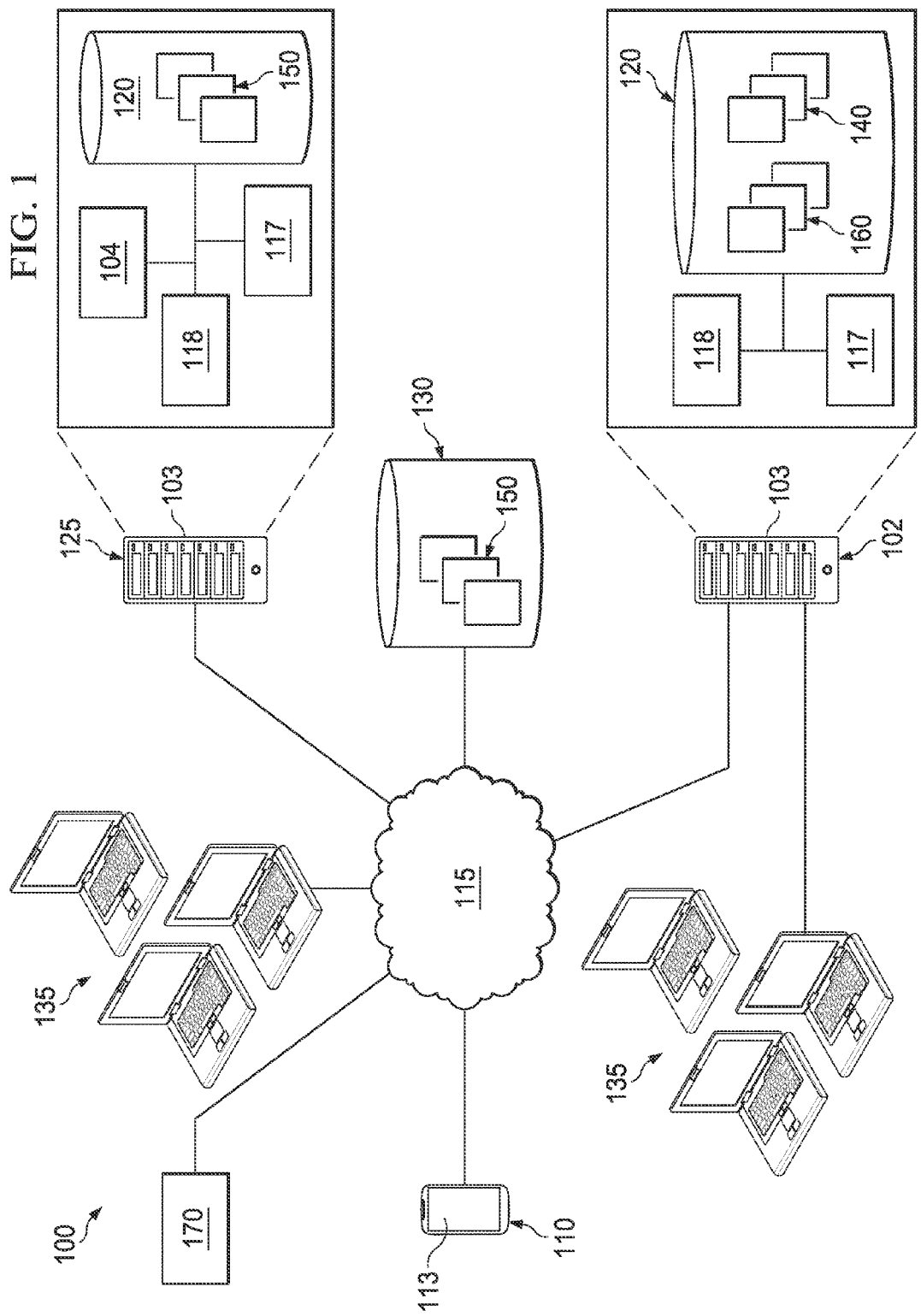
FIG. 1 illustrates an example distributed computing system operable to provide contextually-relevant content.

FIG. 1 illustrates an example distributed computing system 100 operable to providing contextually-relevant content. For example, the illustrated environment 100 includes or is communicably coupled with an enterprise computing system 102, a mobile communications device 110 ("mobile device"), a software provider computing system 125, a repository 130, one or more client computing devices 135 ("clients"), and a third party content provider 170, at least some of which communicate across a network 115.

The enterprise computing system 102 and the software provider computing system 125 both include separate servers 103. In general, each server 103 stores one or more hosted applications, such as, for example, a contextually-relevant content filter module 104, where at least a portion of the hosted applications are executed via requests and responses sent to users or clients within and communicably coupled to the illustrated environment 100 of FIG. 1. In some instances, the server 103 may store a plurality of various hosted applications, while in other instances, the server 103 may be a dedicated server meant to store and execute only a single hosted application (e.g., the contextually-relevant content filter module 104). In some instances, the server 103 may include a web server, where the hosted applications represent one or more web-based applications accessed and executed via network by the mobile device 110, the clients 135, or both to perform the programmed tasks or operations of the hosted application.

At a high level, each server 103 includes an electronic computing device operable to receive, transmit, process, store, or manage data and information associated with the environment 100. For example, one or both of the servers 103 illustrated in FIG. 1 may be responsible for receiving application requests from one or more client applications associated with the mobile device 110, the clients 135 or both of the environment 100 and responding to the received requests by processing said requests in an associated hosted application, and sending the appropriate response from the hosted application back to the requesting client application. In addition to requests from the mobile device 110, the clients 135 or both illustrated in FIG. 1, requests associated with the hosted applications may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates single servers 103 for each of the enterprise computing system 102 and software developer computing system 125, environment 100 can be implemented using two or more servers 103 for each computing system (102 and 125), as well as computers other than servers, including a server pool. Indeed, server 103 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 103 may be adapted to execute any operating system, including Linux, UNIX, Windows, Mac OS, or any other suitable operating system.

The server 103 of software provider computing system 125 includes a contextually-relevant content filter module 104. The contextually-relevant content filter module 104 filters the web content such that contextually-relevant content is displayed to a user of the mobile device 110, the client devices 135, or both, as described further below. The content can be filtered based on a user's role. The contextually-relevant filter module 104 can be implemented by and stored by any combination of the enterprise computing system 102, the software providing computer system 125, the repository 130, the clients 135, and the mobile device 110.

Each of the illustrated servers 103 also includes an interface 117, a processor 118, and a memory 120. The interface 117 is used by the server 103 for communicating with other systems in a distributed environment—including within the environment 100—connected to the network 115; for example, the clients 135, the mobile device 110, or both, as well as other systems communicably coupled to the network 115. Generally, each interface 117 includes logic encoded in software and/or hardware in a suitable combination and operable to communicate with the network 115. More specifically, each interface 117 may include software supporting one or more communication protocols associated with communications such that the network 115 or interface's hardware is operable to communicate physical signals within and outside of the illustrated environment 100.

As illustrated in FIG. 1, each of the servers 103 includes a processor 118. Although illustrated as a single processor 118 in FIG. 1, two or more processors may be used according to particular needs, desires, or particular embodiments of the environment 100. Each processor 118 may be a central processing unit (CPU), a blade, an application specific integrated circuit (ASIC), a field-programmable gate array (FPGA), or another suitable component. Generally, the processor 118 executes instructions and manipulates data to perform the operations of the server 103. For example, the processor 118 executes the functionality required to receive and respond to requests from the clients 135 and/or the mobile device 110.

Regardless of the particular implementation, "software" may include computer-readable instructions, firmware, wired or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

Each of the servers 103 also includes a memory 120, or multiple memories 120. The memory 120 may include any memory or database module and may take the form of volatile or non-volatile memory including, without limitation, magnetic media, optical media, random access memory (RAM), read-only memory (ROM), removable media, or any other suitable local or remote memory component. The memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the computing system 102, 125. Additionally, the memory 120 may include any other appropriate data, such as VPN applications, firmware logs and policies, firewall policies, a security or access log, print or other reporting files, as well as others.

The environment further includes a repository 130. In some embodiments, the repository 130 is an in-memory repository. The repository 130 can be a cloud-based storage medium. For example, the repository 130 can be networked online storage where data is stored on virtualized pools of storage.

The illustrated environment of FIG. 1 also includes one or more clients 135 and the mobile device 110, or multiple mobile devices 110. Each client 135 and/or the mobile device 110 may be any computing device operable to connect to or communicate with at least the computing systems 102, 125 and/or via the network 115 using a wireline or wireless connection. In general, each client 135 and/or the mobile device 110 includes an electronic computer device operable to receive, transmit, process, and store any appropriate data associated with the environment 100 of FIG. 1.

There may be any number of clients 135 and/or mobile devices 110 associated with, or external to, the environment 100. For example, while the illustrated environment 100 includes six clients 135 and one mobile device 110, alternative implementations of environment 100 may include a single client 135 or multiple mobile devices 110 communicably coupled to the server 102 and/or the network 115, or any other number suitable to the purposes of the environment 100.

Additionally, there may also be one or more additional clients 135 and/or mobile devices 110 external to the illustrated portion of environment 100 that are capable of interacting with the environment 100 via the network 115. Further, the term "client" and "user" may be used interchangeably as appropriate without departing from the scope of this disclosure. Moreover, while each client 135 and/or the mobile device 110 is described in terms of being used by a single user, this disclosure contemplates that many users may use one computer, or that one user may use multiple computers. As used in this disclosure, the client 135 is intended to encompass a personal computer, tablet computer, smart phone, cell phone, personal digital assistant (PDA), touch screen terminal, workstation, network computer, kiosk, one or more processors within these or other devices, or any other suitable processing device.

The illustrated mobile device 110 may be any mobile computing device such as a wireless data port, smart phone, personal data assistant (PDA), tablet computing device, one or more processors within these devices, or any other suitable processing device. For example, each client 135 and the mobile device 110 may include a computer that includes an input device, such as a keypad, touch screen, mouse (in the client 135 example), or other device that can accept user information, and an output device that conveys information associated with the operation of the computing systems 102, 125 or the client 135 or the mobile device 100 itself, including digital data, visual information, or a graphic user interface (GUI) 113, as shown with respect to the mobile device 110. In the example of the clients 135, both the input and output device may include fixed or removable storage media such as a magnetic storage media, CD-ROM, or other suitable media to both receive input from and provide output to users of the clients 135 through the display.

Further, the mobile device 110 includes the GUI 113 to interface with at least a portion of the environment 100 for any suitable purpose, including generating a visual representation of a web browser. Generally, through the GUI 113, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 113 can represent any graphical user interface, including but not limited to, a web browser, touch screen, or command line interface (CLI) that processes information in the environment 100 and efficiently presents the information results to the user. In general, the GUI 113 may include a plurality of user interface (UI) elements, some or all associated with a web browser, such as interactive fields, pull-down lists, and buttons operable by the user at the mobile device 113. These and other UI elements may be related to or represent the functions of the web browser. In particular, the GUI 113 may be used to view and navigate various web pages located both internal and external to the server.

In some embodiments, one or more of the mobile device 110 (or mobile devices 110) and clients 135 may access one or more applications hosted on the software developer computing system 125 through a portal such as an enterprise portal, also known as an enterprise information portal (EIP) or corporate portal. The web portal (e.g., portal 204 illustrated in FIG. 2) may be a framework for integrating information, people and processes across organizational boundaries. It provides a secure unified access point, often in the form of a web-based user interface, and is designed to aggregate and personalize information through application-specific portlets. For example, the web portal may exhibit de-centralized content contribution and content management, which keeps the information always updated. With only a web browser, users can begin work once they have been authenticated in the portal which offers a single point of access to information, enterprise applications, and services both inside and outside an organization. Enterprise portals may present information from diverse sources in a unified way, and provide additional services, such as an internal search engine, e-mail, news, and various other features. Enterprise portals are often used by enterprises for providing their employees, customers, and possibly additional users with a consistent look and feel, and access control and procedures for multiple applications, which otherwise would have been separate entities altogether The environment 100 further includes user data 140, web content 150, and content items 160. In the illustrated embodiment, the user data 140 is stored by the memory 120 of the enterprise computing system 102. However, the user data 140 can be stored in any combination of the memory of the mobile device 110, the enterprise computing system 102, the software provider service computing system 125, the repository 130, and/or the clients 135. In some implementations, the user data 140 is stored by a third party that provides networked online storage.

The web content 150 is the textual, visual or aural content that is encountered as part of the user experience on websites. The web content 150 may include, among other things: text, images, sounds, videos, applications, sub-applications, and animations. The web content is stored by any combination of the software provider service computing system 125 and the repository 130.

The content items 160 are sub-portions of the web content 150. The content items 160 are any kind of application, information, or service that can be visualized in a Web browser frame. The content items 160, in some embodiments, may be self-contained Web documents that are provided via a Uniform Resource Locator (URL) that are managed by the enterprise computing system 102. For example, the content items 160 can include alerts, reports, emails, calendars, text documents, multimedia files, reports, files, applications, and other content. For example, if a user enters a word in a dictionary content item 160, the definition appears inside the area of the content item 160. A link to usage examples, similar words, etc. can also be provided.

The content items 160 can include one or more of the characteristics of: stateless (not permanently connected to any component of the environment 100); embedded (non-dominant, parallel to other content items 160); provide previews on underlying processes and/or data; one-screen interactions; include only key functionality; provide direct access without navigation; push information and refresh periodically; integration with third-party software; and allow users to modify an appearance thereof. The content items 160 may provide data, for example, providing active information; monitor business processes; preview data and processes; display notifications for starting task-related processes; and offering access to often used data. The sub content items 160 may further provide direct access to simple applications; accelerated access to other applications; reduction of information and interaction to the necessary; and drag-and-relate that use outputs as inputs within the environment 100. The content items 160 offer customization such that specific content items 160, along with reduction of information and tailoring of information presented by the content items 160, can be implemented according to the user data 160.

As illustrated, the content items 160 are stored by the memory 120 of the enterprise computing system 102. However, the content items 160 can be stored in any combination of the memory the enterprise computing system 102, the software provider service computing system 125, and/or the repository 130. In some embodiments, the content items 160 can be provided by and stored by the third party content provider 170.

Figure 2:
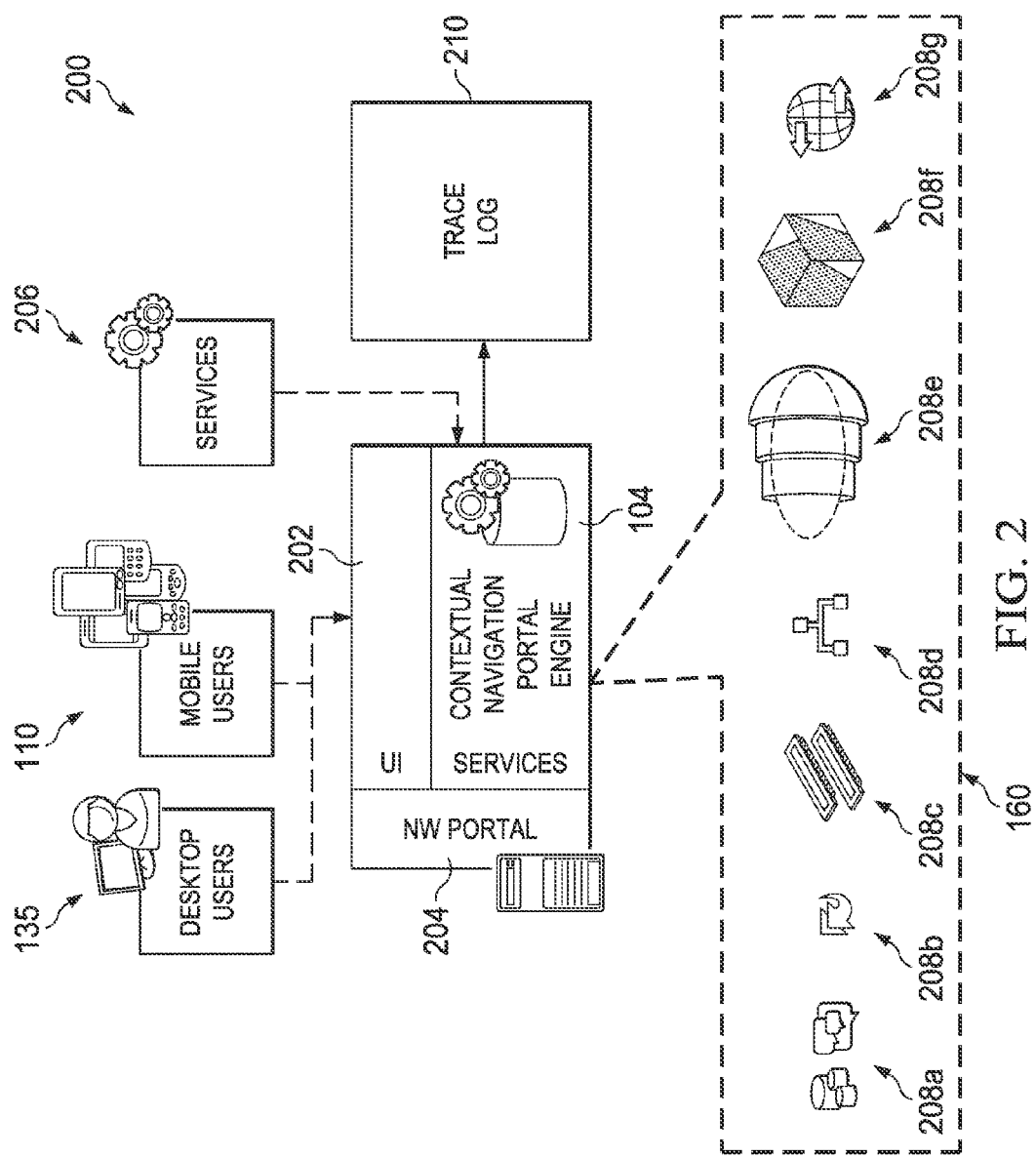
FIG. 2 illustrates an example architecture of a distributed computing system operable to provide contextually-relevant content.

FIG. 2 illustrates an example environment 200 operable to provide contextually-relevant content. The environment 200 includes the clients 135, the mobile device 110, the contextual navigation portal engine 104, a graphical user interface (GUI) 202, a portal 204, services 206, content sources 208a-208g, a trace log 210, and the content items 160.

The content items 160 that are accessed by users of the clients 135, users of the mobile device 110, or users of both ("users") are identified. The users access the content items 160 through interaction with the GUI 202. Each of the users are associated with one or more roles of a plurality of roles that are defined within the portal 204. The role(s) that each user is associated with is stored in the user data 140 for each user. In some embodiments, the role defines a user's position within an organizational structure, such as a user's employment role within a company. For example, the roles of a particular user can include a developer's role, a manager's role, a human resources role, or any combination thereof. Thus, the particular user can be associated with multiple roles. In some embodiments, at least two users are associated with at least one same role. For example, two users are both associated with the developer's role. Further, in some embodiments, the two users are both associated with the developer's role and the human resources role. The content items 160 can be stored by, and retrieved from, the one or more content sources 208a-208g.

In the illustrated embodiment, the services 206 may facilitate communication between the contextual navigation portal engine 104 and one or more clients 135 and/or mobile communication devices 110 outside of the GUI 202. Accordingly, such clients 135 and mobile communication devices 110 may implement the functionality of the contextual navigation portal engine 104 without accessing the GUI 202 (i.e., without a UI layer), such as, for example, through a query.

Content source 208a, for instance, may include a collaboration module that stores, references, and/or accumulates content for sharing and other collaborative actions across multiple systems and/or user (such as across a business enterprise). For example, a collaborative environment or collaboration module in an enterprise environment may share and accumulate information (i.e., content) that enables users to share content and work together in mutual areas in the portal.

Content source 208b, for instance, may include an enterprise resource system (ERP) associated with the software developer computing system 125 that integrates internal and external business and management information across a business enterprise (e.g., finance/accounting, manufacturing, sales and service, and customer relationship management streams of data). The ERP system may facilitate the flow of information between all business functions inside the boundaries of the organization and manage the connections to outside customers and/or clients. The ERP system may include a client/server architecture with one or more databases with modifiable software executing thereon to provide an end-to-end business solution.

Content source 208c, for instance, may include content stored, referenced, and/or calculated on an in-memory database associated with the software developer computing system 125. The in-memory database may include integrated processing, i.e., all business and/or analytic operations done in processing memory. Moreover, content from business content sources may be replicated from one or more transactional systems (e.g., coupled to the network 115) to the in-memory database immediately. Thus, the in-memory database, in some aspects, may handle the analytical systems for all business data in real-time, as opposed to, for instance, computational processing systems that have separate transactional and analytical systems that connect through relational databases (i.e., relational databases stored on magnetic memory that require a process, e.g., ETL, to transfer data from one system to another not in real time but with a delay of an hour, day, week, or longer). In some embodiments, the in-memory database may expose business data and capabilities to improve an end-solution for end users (e.g., the clients 135). The in-memory database may reside on top of a computational engine that facilitates fast manipulations on large amounts of business data and/or replication of entire business suite information. Thus, in some embodiments, the in-memory database may provide for the following design principles/concepts: business data in real-time (e.g., GUI patterns for constantly updated business data); well modeled tables and data cubes (e.g., in order to provide semantic services); a highly parallelized computational engine (e.g., for computationally intensive GUI patterns such as real time alerts and/or suggestions); close coupling of business logic and business data (e.g., eliminating indexing and caching).

Content source 208*d*, for instance, may include a gateway technology associated with the software developer computing system 125 that provides a simple way to connect devices, environments and platforms based on market standards. For example, the gateway may, for example, be a front-end server to a business suite application and expose business suite services in an open protocol format. Exposed content may include, business and/or social data through social updates, for example, Twitter, Facebook, RSS feed/channels, and/or other feed sources or channels.

Content source 208*e*, for instance, may include a business object repository. Each business object stored in the repository, for example, may include a capsule with an internal hierarchical structure, behavior offered by its operations, and integrity constraints. In general, the overall structure of the business object model ensures the consistency of the interfaces that are derived from the business object model. The derivation helps ensure that the same business-related subject matter or concept can be represented and structured in the same way in various interfaces. The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Business objects are generally semantically disjointed, i.e., the same business information is represented once. In some embodiments, the business objects are arranged in an ordering framework such that they can be arranged according to their existence dependency to each other. For example, in a modeling environment, the customizing elements might be arranged on the left side of the business object model, the strategic elements might be arranged in the center of the business object model, and the operative elements might be arranged on the right side of the business object model. Similarly, the business objects can be arranged in this model from the top to the bottom based on defined order of the business areas, e.g., finance could be arranged at the top of the business object model with customer relationship management (CRM) below finance and supplier relationship management (SRM) below CRM. To help ensure the consistency of interfaces, the business object model may be built using standardized data types as well as packages to group related elements together, and package templates and entity templates to specify the arrangement of packages and entities within the structure.

A business object may be defined such that it contains multiple layers. Typical business object may contains four layers: a kernel layer, an integrity layer, an interface layer, and an access layer. The innermost layer of the example business object is the kernel layer. The kernel layer represents the business object's inherent data, containing various attributes of the defined business object. The second layer represents the integrity layer. The integrity layer contains the business logic of the object. Such logic may include business rules for consistent embedding in a computing environment and the constraints regarding the values and domains that apply to the business object. Business logic may include statements that define or constrain some aspect of the business, such that they are intended to assert business structure or to control or influence the behavior of the business entity. It may pertain to the facts recorded on data and constraints on changes to that data. In effect, business logic may determine what data may, or may not, be recorded in business object. The third layer, the interface layer, may supply the valid options for accessing the business object and describe the implementation, structure, and interface of the business object to the outside world. To do so, the interface layer may contain methods, input event controls, and output events. The fourth and outermost layer of the business object is the access layer. The access layer defines the technologies that may be used for external access to the business object's data. Some examples of allowed technologies may include COM/DCOM (Component Object Model/Distributed Component Object Model), CORBA (Common Object Request Broker Architecture), RFC (Remote Function Call), Hypertext Transfer Protocol (HTTP) and Java, among others. Additionally, business objects of this embodiment may implement standard object-oriented technologies such as encapsulation, inheritance, and/or polymorphism.

Content source 408*f*, for instance, may include, a business intelligence module that, at a high level, provides software and/or middleware services for performance analytics (e.g., supports organizational efforts to develop sophisticated visual representations of processes and performance, providing organizations with new insights that can help them make more informed decisions, assess and plan a business intelligence strategy, deploy dashboard tools, generate management and operational reports, and build an IT infrastructure that provides high scalability for users and data); services for analytic applications (e.g., provides guidance and deployment expertise in implementing analytic applications, offering pre-built analytics and data models to help a customer with a specific business problem in various industries, helping organizations to efficiently deploy applications); and introductory business intelligence services (e.g., introduces organizations to the dynamics of using business intelligence, providing the ability to leverage the functionality of business intelligence—such as executive dashboards and operational reports—without initiating a full-scale implementation).

Content source 208*f*, for instance, may be content from third party platforms, such as content from third parties unaffiliated with, for example, the software developer computing system 125 and enterprise computing system 102. For instance, content source 208*f* may be content from third party content provider 170.

The illustrated trace log 210 is updated based on at least a portion of the content 140 that is identified. For example, upon accessing content items 160 by the users, the contextual navigation portal engine 104 provides a request header. The request header generates the trace log 210 that records activity traces regarding the roles of the users that are accessing the content items 160. The trace log 210 is based on the roles of the users accessing the content 140 and is independent of which particular users are accessing the content. The trace log 210 includes information associated with the identified content items 160, and in particular, associations between each identified content item 160 and the role that accesses each identified content item 160. For example, a first user having a developer's role and a manager's accesses a first content item 160; a second user having a managers' role access the first content item 160 and a second content item 160; and a third user having a developer's role and a human resources role accesses the second content item 160. Thus, the trace log 210 includes an association between the developer's role and the first 140 and the second content item 160; an association between the manager's role and the first 140 and the second content item 160; and an association between the human resources role and the second content item 160. In some embodiments, for each access of the content item 160 by a particular role, the trace log 210 can include such information as the time of the access by the particular role and duration of the access by the particular role. The trace log 210 can be stored by the memory 120 of the computing systems 102, the computing system 125, the repository 130, or any combination thereof. In some embodiments, the trace log 210 can be stored by a directory, a database, or both.

The portal 204 can receive a search query from the users for one or more content items 160 (e.g., through the GUI 202 or services 206). For example, the portal 204 can receive a search query from a user having a particular role within the portal 204. For example, the portal 204 can receive a search query from a user that has the developer's role for specific content items 160. In response to receiving the search query, the portal 204 determines a plurality of results responsive to the search query, with the plurality of results relating to the content items 160. For example, the portal 204 determines a plurality of results in response to a search query from a developer's role.

The plurality of search results that are determined in response to the search query may be filtered. For instance, the plurality of search results may be filtered for the particular role based on the information (e.g., the associations) of the trace log 210. The portal 204 provides the plurality of results to the contextual navigation portal engine 104. The contextual navigation portal engine 104 filters the results in view of the trace log 210 for the particular role. For example, the plurality of search results that are in response to the search query from the developer's role are filtered for the developer's role.

In some embodiments, the plurality of search results are filtered to include content items 160 associated with the particular role. For example, the contextual navigation portal engine 104 compares (e.g., matches) the provided search results with the associations of the trace log 210. As mentioned above, the trace log 210 includes information about associations between each identified content item 160 and the role(s) that access each identified content item 160. Thus, the contextual navigation portal engine 104 compares the provided search results (that relate to the content items 160) with the content items 160 that are associated with the particular role based on the trace log 210. The contextual navigation portal engine 104 determines matches between the provided search results and the content items 104 of the trace log 210 for the particular role. Accordingly, the contextual navigation portal engine 104 filters the search results to include content items 160 that are associated with the particular role. For example, the contextual navigation portal engine 104 filters the search results to include content items 160 that are associated with the developer's role based on the associations of the trace log 210.

In some embodiments, the search results are filtered to include only content items 160 that are associated with the particular role. For example, the contextual navigation portal engine 104 filters (e.g., removes) search results from the provided search results that do not match the identified content items 160 of the trace log 210 for the particular role. In other words, the contextual navigation portal engine 104 maintains the search results within the provided search results that do have a match with the identified content items 160 of the trace log 210 for the particular role. Continuing the example above, the contextual navigation portal engine 104 filters the search results in response to the search query from the developer's role. In particular, the contextual navigation portal engine 104 filters (e.g., removes) search results that are not associated with the developer's role based on the associations of the trace log 210. The contextual navigation portal engine determines which search results are related to the developer's role based on the trace log 210.

A plurality of filtered results are generated for presentation through the portal 204. For example, the contextual navigation portal engine 104 filters the search results to generate a plurality of filtered results. The plurality of filtered results are for presentation through the portal 204, and specifically, through the GUI 202. Continuing the example above, the plurality of results are filtered for the developer's role based on the associations of the trace log 210 to generate a plurality of filtered search results. The filtered results are presented to the user having the developer's role through the portal 204 via the GUI 202. The filtered results can include only search results that match content items 104 that are associated with the developer's role as stored in the trace log 210.

In some embodiments, the trace log 210 can be indexed by one or more differing criteria. For example, the contextual navigation portal engine 204 can index the trace log 210 by one or more differing criteria. In some embodiments, the contextual navigation portal engine 204 can index the trace log 210 by a type of the content items 104 (e.g., text document, multimedia file, a report, files, applications, etc.), a number of times the content items 104 have been accessed, a most recent access of the content items 104 duration of the access of the content items 104, or any combination thereof.

In some embodiments, a ranking score can be determined for each content item 104 that is accessed by each role of the plurality of roles, including the particular role. For example, the contextual navigation portal engine 204 can determine a ranking score for each content item 104 for each role accessing the content item 104. The ranking score can be based on the associations stored by the trace log 210. In some embodiments, the ranking score can be stored by the trace log 210. The ranking score can be based on one or more differing criteria. For example, the ranking score for each content item 160 for each role accessing the content item 160 can be based on a type of the content item 104 (e.g., text document, multimedia file, a report, files, applications, etc.), a number of times the content items 104 have been accessed, a most recent access of the content items 104, duration of the access of the content items 104, a number of same roles accessing the content items 104, or any combination thereof.

The contextual navigation portal engine 104, in some embodiments, employs a ranking algorithm that uses one or more of the ranking criteria to determining the ranking score of each content item 104 for each role accessing the content items 104. For example, the contextual navigation portal engine 104 can determine, based on the indexing of the trace log 210, a ranking score for each content item 160 that was accessed by users associated with the developer's role. The ranking score for each content item 160 can differ for each role of the plurality of roles accessing the content item 160. For example, with respect to a first role, the content item 160 can have a first ranking score and with respect to a second role, the content item 160 can have a second, differing score.

Additionally, in some embodiments, generating the plurality of filtered search results can further include ranking the filtered search results based on the ranking scores of the content items 160 associated with the filtered search results. For example, the content navigational portal engine 104 can rank the filtered search results for the particular role based on one or more differing criteria. For example, the contextual navigational portal engine 104 ranks filtered search results for the developer's role based on the ranking scores of the content items 104 associated with the filtered search results. The contextually navigation portal engine 104 can rank the filtered search results from a high ranking score to a low ranking score of the related content items 160.

Additionally, in some embodiments, a subset of the content items 104 can be provided that include a ranking score above a threshold. For example, as mentioned above, the contextual navigational portal engine 104 determines a ranking score for each content item 160 that is accessed by each role of the plurality of roles. For each role, the contextual navigational portal engine 104 can provide the subset of content items 104 that have a ranking score above the threshold. In some embodiments, the contextual navigational portal engine 104 provides the subset of content items 104 when the user accesses the portal 204 (e.g., when the user "logs in" to the portal 204). In an example, when the user having the developer's role accesses the portal 204, the contextual navigational portal engine 104 provides content items 104, based on the trace log 210, having a ranking score above the threshold.

In some embodiments, the contextual navigational portal engine 104 provides the subset of content items 104 that have a ranking score above a threshold and are within a predetermined range of content items 104. For example, for the developer's role, the contextual navigation portal engine 104 provides the content items 104, based on the trace log 210, having a ranking score above a threshold and that are within the top 10 of the content items 104 based on the ranking score.

In some embodiments, the contextual navigational portal engine 104 provides the subset of the content items 104, for each role based on the trace log 210, independent of receiving the search query. Thus, the subset of the content items 104 can be provided regardless of the search query and the subset can be the "top" content items 104 that are related to the particular role of the user accessing the portal 204. For example, when the user having the developer's role accesses the portal 204, the contextual navigational portal engine 204 provides to the user via the GUI 202 a "top ten" listing of content items 204, based on the trace log 210, for the developer's role.

In some embodiments, a number of shared roles between two users can be determined and the ranking score can be altered based on the number of shared roles. For example, as mentioned above, the contextual navigational portal engine 104 determines a ranking score for each content item 160 that is accessed by each role of the plurality of roles. Furthermore, one or more users each having one or more roles can access the content items 160, with this information included by the trace log 210, that is, the associations between each accessed content item 160 and the role accessing each content item 160. The contextual navigational portal engine 104 determines between any two users accessing the content items 160 a number of shared roles between the two users. For example, a first user can have a developer's role, a manger's role, and a human resources role; a second user can have a developer's role and a mangers role; and a third user can have a human resources role. Thus, the first user and the second user have two shared roles (the developer's role and the manager's role) and the first user and the third user have one shared role (the human resources role).

The contextual navigational portal engine 104 can alter the ranking score of the content items 104 based on the number of shared roles between the two users. For example, when a user having two or more roles accesses the portal 204, the ranking score of the content items 104, based on the trace log 210, are altered based on the number of shared roles between the user and other users also accessing (currently or previously) the content items 104. For example, when the first user having the developer's role, the mangers role, and the human resources role provides a search query to the portal 204, the contextual navigational portal engine 104 alters the ranking score of the filtered search results in view of each other user's access of the content items 104 related to the filtered search results, and the number of shared roles between the first user and each other user's access of the content items 104 related to the filtered search results. Thus, when a first content item 160 is accessed by the second user having two shared roles with the first user and a second content item 160 is accessed by the third user having one shared role with the first user, the contextual navigation portal engine 104 can alter the ranking score to increase the ranking score for the first content item 160 as compared to the second content item 160.

The contextual navigation portal engine 104 can include further additional functions. For example, the contextual navigation portal engine 104 can access multiple repositories (e.g., the memory 120 of systems 102 and 103 and the repository 130) with a single query. Accordingly, the portal 204 can create separate indexes for each repository, and thus, allow the users accessing the portal 204 to choose which repository they wish to search over (e.g., which repositories to generate search results from for a given search query). Another function includes security controls, that is, restriction of access to sensitive information (e.g., sensitive content items 160) in the repositories to authorized users. The authorization of the users is based on the security and user mapping capabilities of the portal 204. A function of the contextual navigation portal engine 104 includes maintaining index freshness and completeness. For example, during indexing of the repositories, and particularly, the trace log 210, content items 104 that are determined to be critical are kept available and up-to-date for searching. Further, only portions of the trace log 210 that are changed since the previous indexing are updated. Thus, a balance between freshness and load of the trace log 210 is created.

A function of the contextual navigation portal engine 104 also includes scalability of the navigation portal engine 104. For example, the contextual navigation portal engine 104 can handle varying amounts of content items 160 and associations of the content items 160 and the roles accessing the content items in the trace log 210. A function of the contextual navigation portal engine 104 also includes a pattern analyzer. For example, the contextual navigation portal engine 104 can determine navigation patterns based on navigational history of the users, and can alter the GUI 202 when a relevant navigational pattern is determined. Another function of the contextual navigation portal engine 104 includes mashups in that the contextual navigation portal engine 104 can provide to the portal 204 content items 104 that are determined to be relevant to the role of the user accessing the portal for a quick creation of the GUI 202.

Figure 3:
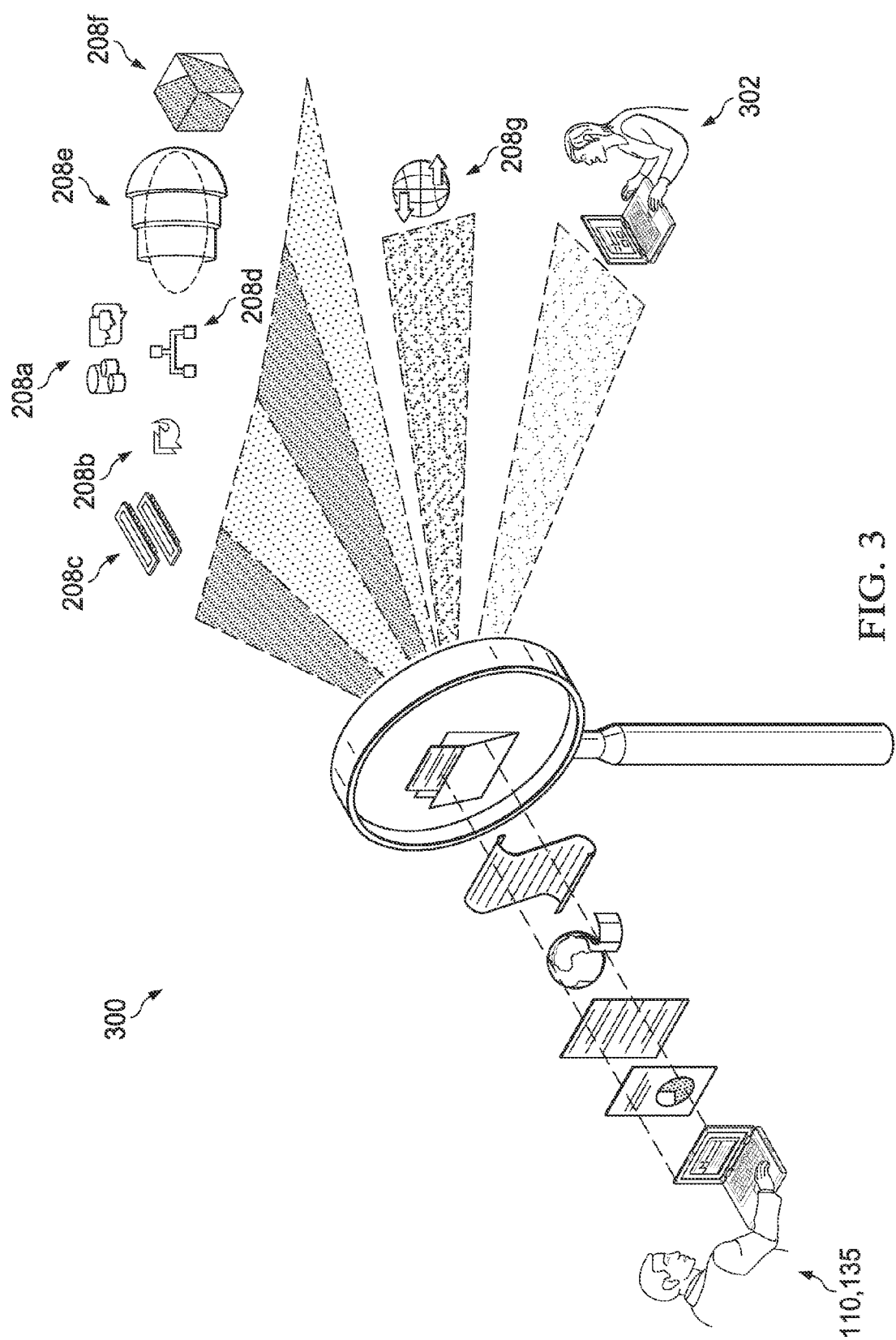
FIG. 3 illustrates a portal administrator with respect to a contextual navigation portal engine.

FIG. 3 illustrates a portal administrator with respect to the contextual navigation portal engine 104. For example, a portal administrator 302 can have many functionalities with respect to the contextual navigation portal engine 104. For example, the portal administrator 302 can determine when the contextual navigational portion engine 104 indexes the trace log 210. As mentioned above, indexing of the trace log 210 impacts the search results that are provided to the user. For example, when indexing of the trace log 210, the content items 160 that relate to the search results are unable for searching, and thus, unavailable for providing to the user. Thus, the portal administrator 302 determines the balance between freshness of the trace log 210 and the completeness of the trace log 210. For example, the portal administrator 302 can provide a time mechanism to index the trace log 210 at specific times or specific time intervals, such as once a day or once an hour.

Further, when a user desires to have (either directly or in response to a search query) content items 104 that were accessed by other users having similar roles within a certain time period, the trace log 210 should be indexed within that time period. For example, a user desires to have content items 104 that were accessed by other user having similar roles within the past twenty-four hours. Thus, the contextual navigation portal engine 104 indexes the trace log 210 every twenty-four hours. Further, the portal administrator 302 can determine which criteria are used to index the trace log 210. Other functions of the portal administrator 302 include allowing a user to view the portal 204, including search results and the provided subset of content items 104, for a role not currently assigned to the user. Further the portal administrator 302 can allow the user to interact with portal 204, including selecting search results and related content items 160 without altering the trace log 210 for the role the user is currently accessing the portal 204. The portal administrator 302 can be a person, a computer-implemented software module, or a combination of both.

Figure 4A:
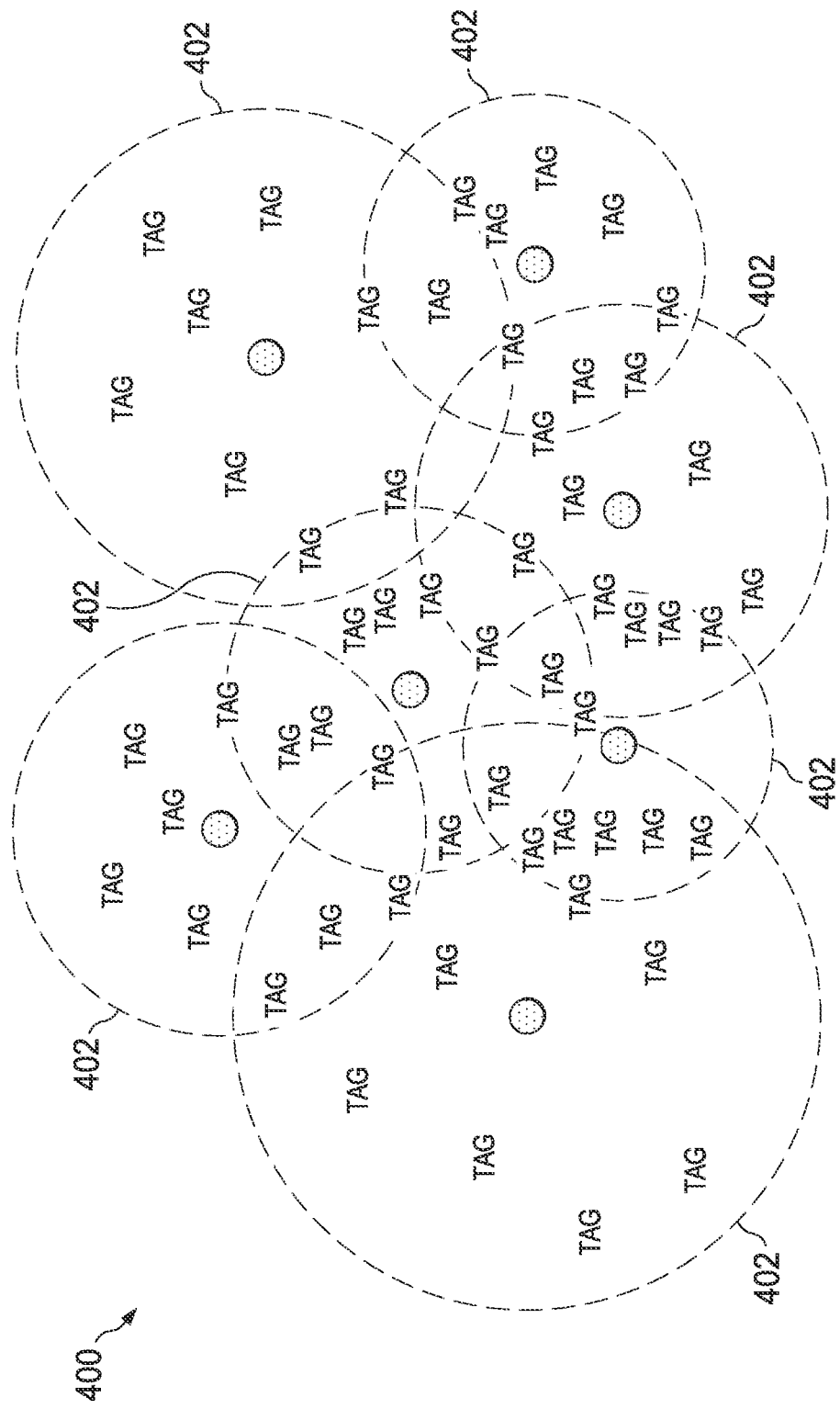
FIGS. 4A-4C illustrate a content items map.

FIG. 4A illustrates a content items map 400. For example, the content items map 400 includes a plurality of circles 402 each representing a differing type of content (e.g., text document, multimedia file, a report, files, applications, etc.). Each circle 402 can include one or more content items 104 of the type. In some embodiments, each of the circles 402 represent a differing type of content in view of a search query. In some embodiments, each of the circles 402 represent a differing type of content for a particular role of a user based on the trace log 210.

Figure 4B:
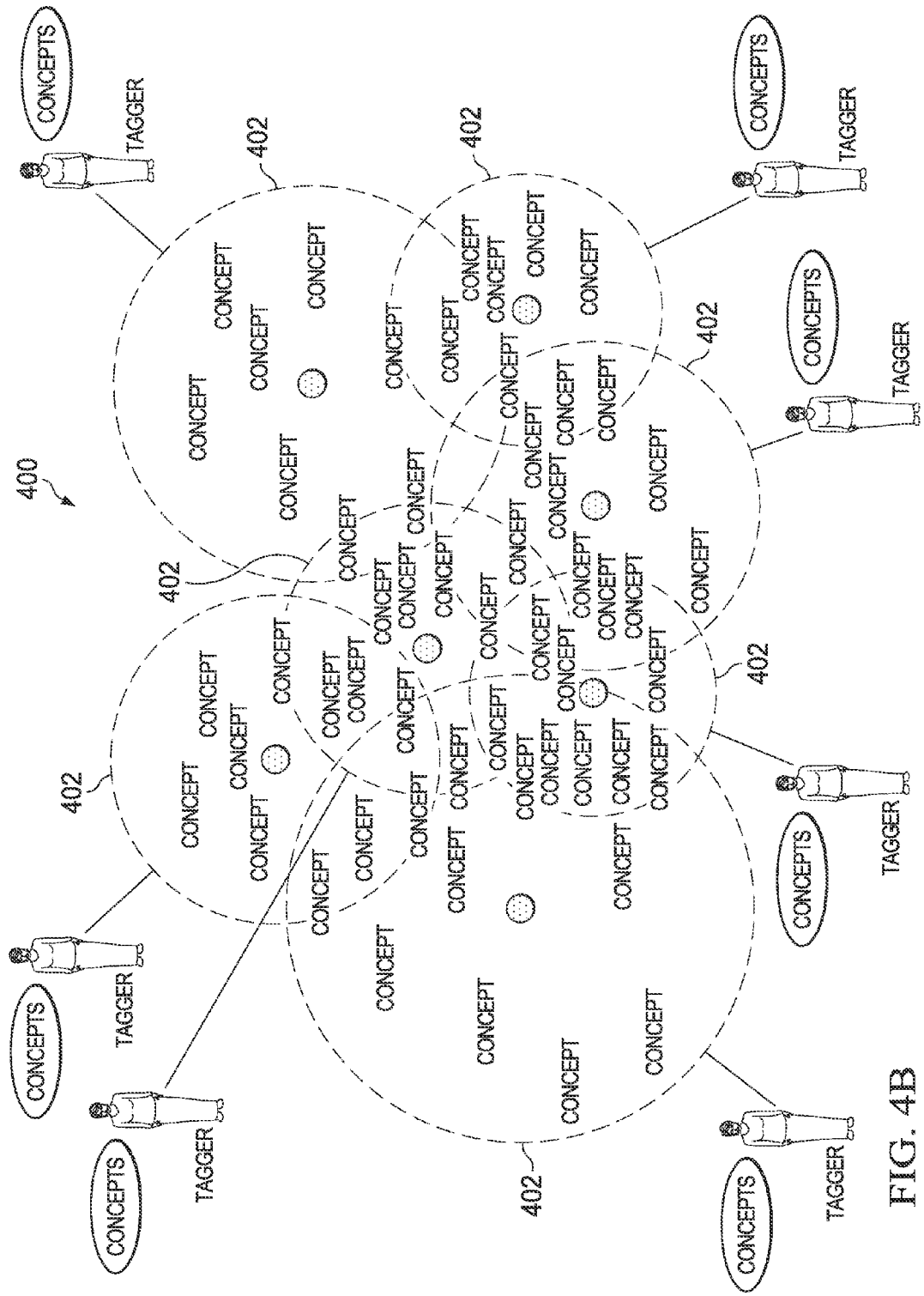

FIG. 4B illustrates user's interactions with the content items map 400. For example, each of the interactions of users of the portal 204, including accessing the content items 160, is logged by the trace log 210 and stored, independent of the role(s) of the user(s) currently accessing the portal 204. In some embodiments, a user can be associated with one (or more) of the circles 402.

Figure 4C:
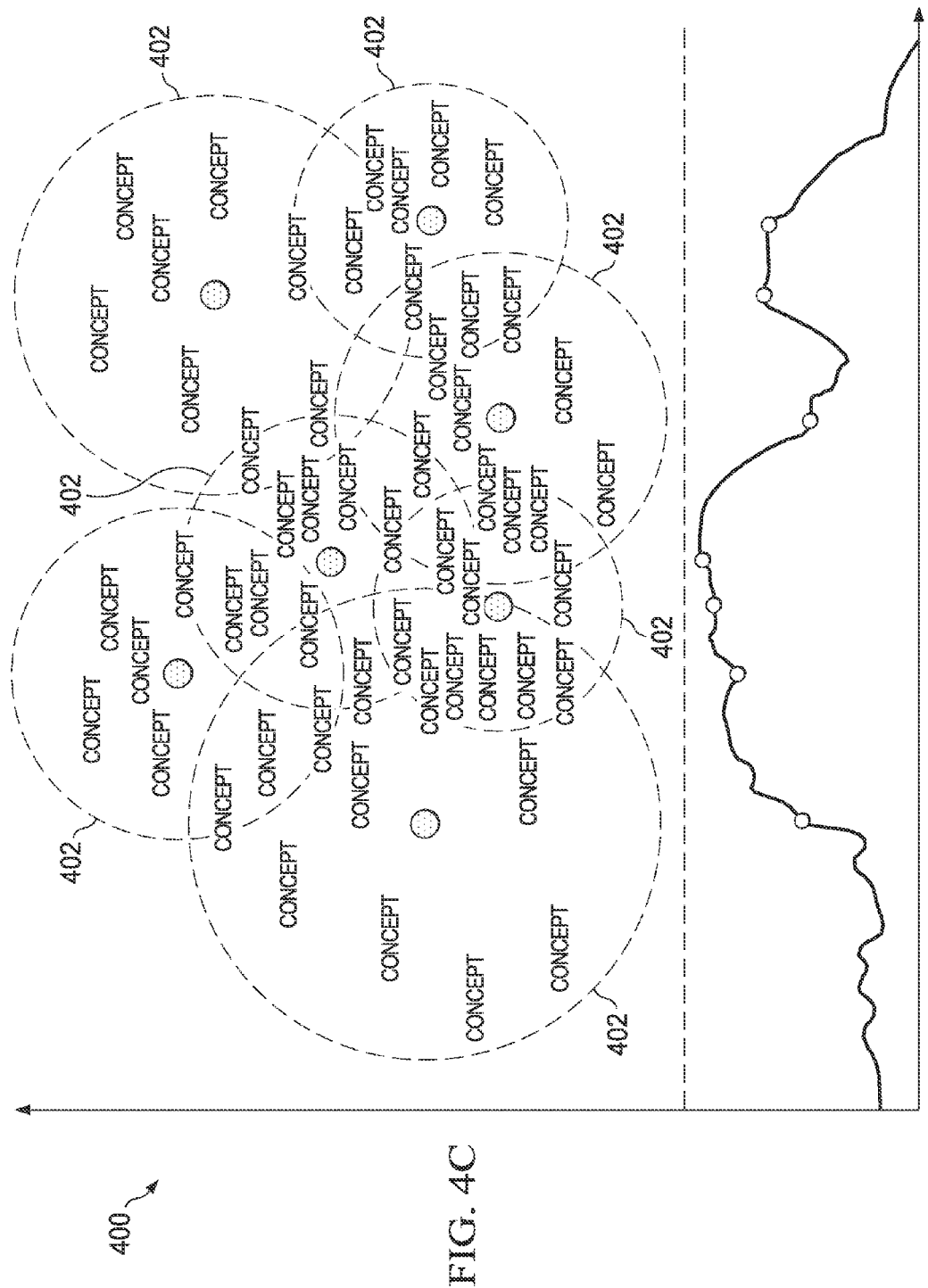

FIG. 4C illustrates the content items map 400 with respect to a semantic field. For example, within any particular circle 402 (i.e., type of content items 160), certain types of content items 160 are more relevant than others based on the number of accesses of the content items 160 for each role of the particular roles and/or the number of shared roles accessing the content items 160.

Figure 5:
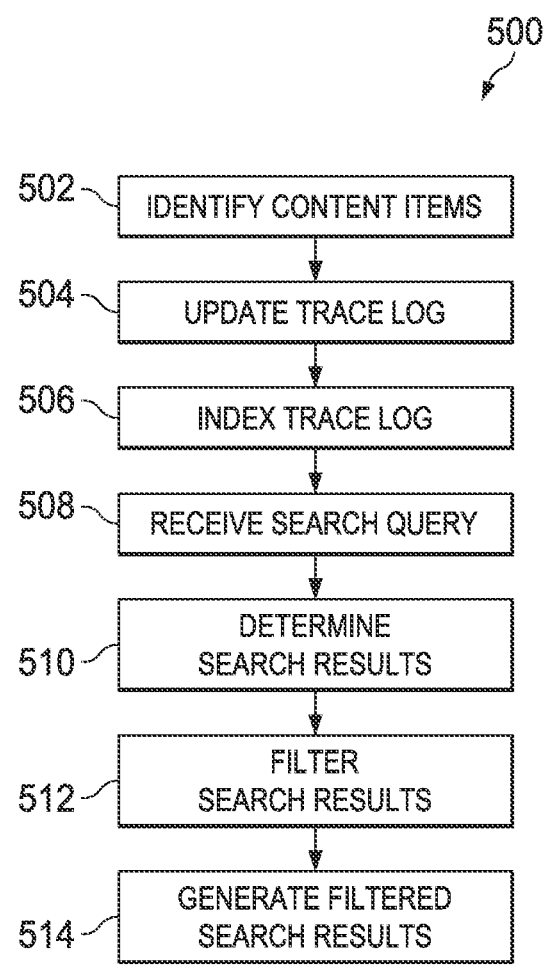
FIG. 5 illustrates an example method for providing contextually-relevant content.

FIG. 5 illustrates an example method 500 for providing contextually-relevant content. The example method 500 can be executed, for example, by the contextually navigation portal engine 104, using one or more computing devices. For example, any combination of the computing systems 102, 125 and the mobile device 110 can be used to execute the example process 500 and obtain any data from the memory of the mobile device 110, the computing systems 102, 125, the repository 130, and/or the clients 135.

In step 502, content items are identified that are accessed by a plurality of users through the portal. For example, the contextual navigation portal engine 104 identifies which content items 160 (e.g., text document, multimedia file, a report, files, applications, etc.) are accessed by the users through the portal 204. In some embodiments, each user that accesses content through the portal may be associated with one or more roles within the portal (e.g., an employee role, an organizational role, or otherwise). In some embodiments, each user has only one role when accessing content through the portal. Alternatively, one or more users may have multiple roles when accessing content through the portal. Further, in some embodiments, two or more users accessing content through the portal (e.g., simultaneously or at different times) may have the same roles or roles in the portal.

In step 504, a trace log is updated to include information associated with the identified content. For example, the contextual navigation portal engine 104 updates the trace log 210 to include associations between each identified content item 160 and the role accessing each identified content item 160. In some embodiments, updating the trace log may include, for example, creating the trace log and/or storing the trace log in a directory, database, or combination thereof.

In step 506, the trace log is indexed based on one or more criteria. For example, the contextual navigation engine 104 indexes the traces log by a type of the content items 160, a number of times the content items 160 are accessed, a most recent access of the content items 160, duration of the access of the content items 160, or any combination thereof. For instance, in some embodiments, indexing the trace log may include determining, based on the indexed trace log, a ranking score for each content item that is accessed by one or more users associated with a particular role in the portal.

In step 508, a search query is received from a user associated with a particular role though the portal for one or more content items. For example, the portal 204 receives the search query for content items 104 from a user associated with a particular role.

In step 510, a plurality of search results are determined that are in response to the search query, the search results relate to the content items 104. For example, the portal 204 determines the plurality of search results in response to the search query provided by the user through the portal 204. In some embodiments, the search results may only include content items 104 that are associated with a particular role.

In step 512, the plurality of search results are filtered for the particular role of the user based on the trace log 210. For example, the contextual navigation portal engine 104 filters the search results from the portal 204 for the particular role of the user based on the trace log 210. In some embodiments, the contextual navigation portal engine 104 filters the search results to include content items 160 associated with the particular role. In some embodiments, the contextual navigation portal engine 104 filters the search results to include only content items 160 associated with the particular role.

In some embodiments, a trace log indexed so as to include a ranking score for each content item that is accessed by one or more users associated with a particular role in the portal may allow for filtering of the search results based on the ranking score. In some embodiments, a sub set of the search results may be provided such that only search results having a ranking score above a threshold score are provided. In some embodiments, the ranking score may be based on, for example, a number of shared roles between two or more users accessing content through the portal.

In step 514, a plurality of filtered search results are generated for presentation through the portal. For example, the contextual navigation portal engine 104 generates the plurality of filtered search results based on the trace log 210 for presentation through the portal 204.

A number of implementations have been described. Nevertheless, it will be understood that various modifications may be made. For example, other methods described herein besides or in addition to that illustrated in FIG. 5 may be performed. Further, the illustrated steps of method 500 may be performed in different orders, either concurrently or serially. Further, steps may be performed in addition to those illustrated in method 500, and some steps illustrated in method 500 may be omitted without deviating from the present disclosure. Accordingly, other implementations are within the scope of the following claims.

What is claimed is:

1. A computer-implemented method for providing contextually-relevant content, the method comprising:
    identifying content items accessed through a portal by a plurality of users, each user associated with one or more roles of a plurality of roles within the portal and authenticated to access information associated with the one or more roles within the portal, the plurality of roles defining respective user positions within an organizational structure of a business enterprise associated with the portal;
    updating a trace log to include information associated with the identified content items, the information comprising associations between each identified content item and the role accessing each identified content item;
    indexing the trace log based on one or more differing criteria;
    determining, based on indexing the trace log, a ranking score for each content item that is accessed by users associated with the particular role;
    determining a number of shared roles between at least two users of the plurality of users;
    altering the ranking score based on the number of shared roles, the altering comprising:
        identifying that a first user of the at least two users is accessing a first content item and a second content item;
        determining that the first content item is accessed by a second user of the at least two users, the first and second users sharing a first number of roles;
        determining that the second content item is accessed by a third user of the at least two users, the first and third users sharing a second number of roles, the second number less than the first number; and
        increasing a ranking score for the first content item as compared to a ranking score of the second content item;
    receiving, from a user associated with a particular role of the plurality of roles, a search query through the portal for one or more content items;
    determining a plurality of search results responsive to the search query, the search results relating to the content items;
    for the particular role, filtering the plurality of search results based on the trace log; and
    generating a plurality of filtered search results for presentation through the portal.

2. The computer-implemented method of claim 1, wherein filtering the plurality of search results based on the trace log comprises filtering the plurality of search results to include content items associated with the particular role.

3. The computer-implemented method of claim 2, wherein the search results only include content items associated with the particular role.

4. The computer-implemented method of claim 1, wherein at least two users of the plurality of users are associated with at least one same role.

5. The computer-implemented method of claim 4, wherein the role comprises an employment role of the user.

6. The computer-implemented method of claim 1, wherein updating the trace log further comprises storing the trace log in a directory, a database, or both.

7. The computer-implemented method of claim 1, wherein indexing the trace log further comprises indexing the trace log based on one or more of a type of the content items, a number of times the content items are accessed, a most recent access of the content items, or a duration of the access of the content items.

8. The computer-implemented method of claim 1, further comprising:
    determining, based on indexing the trace log, a ranking score for each content item that is accessed by users associated with the particular role, and
    wherein generating the plurality of filtered results further comprises ranking the filtered search results based on the ranking scores of the content items associated with the results.

9. The computer-implemented method of claim 8, further comprising:
    determining, based on indexing the trace log, a ranking score for each content item that is accessed by users associated with the particular role; and
    providing a subset of the content items comprising a ranking score above a threshold.

10. The computer-implemented method of claim 1, wherein the search query is received through the portal from a mobile communication device.

11. The computer-implemented method of claim 1, wherein two or more users of the plurality of users are enabled to share information associated with the two or more users and work together in mutual areas within the portal.

12. The computer-implemented method of claim 1, further comprising:
    determining that one or more users access one or more content items through the portal;
    determining one or more roles associated with the determined one or more users; and
    generating, based on the determined roles and the one or more content items, the trace log, the trace log recording activity traces regarding the determined roles and being independent of the determined one or more users.

13. The computer-implemented method of claim 1, further comprising:
    identifying that a first user, having a first role and a second role, accesses a first content item;
    identifying that a second user, having the second role, accesses the first content item and a second content item; and
    updating the trace log to include a first association between the first role and the first content item and a second association between the second role and the first and second content items.

14. A non-transitory computer storage medium encoded with a computer program, the program comprising instructions that when executed by one or more computers cause the one or more computers to perform operations comprising:
    identifying content items accessed through a portal by a plurality of users, each user associated with one or more roles of a plurality of roles within the portal and authenticated to access information associated with the one or more roles within the portal, the plurality of roles defining respective user positions within an organizational structure of a business enterprise associated with the portal;

updating a trace log to include information associated with the identified content items, the information comprising associations between each identified content item and the role accessing each identified content item;

indexing the trace log based on one or more differing criteria;

determining, based on indexing the trace log, a ranking score for each content item that is accessed by users associated with the particular role;

determining a number of shared roles between at least two users of the plurality of users;

altering the ranking score based on the number of shared roles, the altering comprising:

identifying that a first user of the at least two users is accessing a first content item and a second content item;

determining that the first content item is accessed by a second user of the at least two users, the first and second users sharing a first number of roles;

determining that the second content item is accessed by a third user of the at least two users, the first and third users sharing a second number of roles, the second number less than the first number; and increasing a ranking score for the first content item as compared to a ranking score of the second content item;

receiving, from a user associated with a particular role of the plurality of roles, a search query through the portal for one or more content items;

determining a plurality of search results responsive to the search query, the search results relating to the content items;

for the particular role, filtering the plurality of search results based on the trace log; and generating a plurality of filtered search results for presentation through the portal.

15. The computer storage medium of claim 14, wherein filtering the plurality of search results based on the trace log comprises filtering the plurality of search results to include content items associated with the particular role.

16. The computer storage medium of claim 15, wherein the search results only include content items associated with the particular role.

17. The computer storage medium of claim 14, wherein at least two users of the plurality of users are associated with at least one same role.

18. The computer storage medium of claim 14, wherein indexing the trace log further comprises indexing the trace log based on one or more of a type of the content items, a number of times the content items are accessed, a most recent access of the content items, or a duration of the access of the content items.

19. The computer storage medium of claim 14, further comprising:

determining, based on indexing the trace log, a ranking score for each content item that is accessed by users associated with the particular role, and wherein generating the plurality of filtered results further comprises ranking the filtered search results based on the ranking scores of the content items associated with the results.

20. The computer storage medium of claim 19, further comprising:

determining, based on indexing the trace log, a ranking score for each content item that is accessed by users associated with the particular role; and providing a subset of the content items comprising a ranking score above a threshold.

21. The computer storage medium of claim 14, wherein the search query is received through the portal from a mobile communication device.

22. A computing system comprising one or more memory modules, one or more processors, and instructions stored on one or more of the memory modules and operable when executed with the one or more processors to perform operations comprising:

identifying content items accessed through a portal by a plurality of users, each user associated with one or more roles of a plurality of roles within the portal and authenticated to access information associated with the one or more roles within the portal, the plurality of roles defining respective user positions within an organizational structure of a business enterprise associated with the portal;

updating a trace log to include information associated with the identified content items, the information comprising associations between each identified content item and the role accessing each identified content item;

indexing the trace log based on one or more differing criteria;

determining, based on indexing the trace log, a ranking score for each content item that is accessed by users associated with the particular role;

determining a number of shared roles between at least two users of the plurality of users;

altering the ranking score based on the number of shared roles, the altering comprising:

identifying that a first user of the at least two users is accessing a first content item and a second content item;

determining that the first content item is accessed by a second user of the at least two users, the first and second users sharing a first number of roles;

determining that the second content item is accessed by a third user of the at least two users, the first and third users sharing a second number of roles, the second number less than the first number; and increasing a ranking score for the first content item as compared to a ranking score of the second content item;

receiving, from a user associated with a particular role of the plurality of roles, a search query through the portal for one or more content items;

determining a plurality of search results responsive to the search query, the search results relating to the content items;

for the particular role, filtering the plurality of search results based on the trace log; and generating a plurality of filtered search results for presentation through the portal.

23. The system of claim 22, wherein filtering the plurality of search results based on the trace log comprises filtering the plurality of search results to include content items associated with the particular role.

24. The system of claim 23, wherein the search results only include content items associated with the particular role.

25. The system of claim 22, wherein at least two users of the plurality of users are associated with at least one same role.

26. The system of claim 22, wherein indexing the trace log further comprises indexing the trace log based on one or more of a type of the content items, a number of times the content items are accessed, a most recent access of the content items, or a duration of the access of the content items.

27. The system of claim 22, further comprising:
determining, based on indexing the trace log, a ranking score for each content item that is accessed by users associated with the particular role, and
wherein generating the plurality of filtered results further comprises ranking the filtered search results based on the ranking scores of the content items associated with the results.

28. The system of claim 27, further comprising:
determining, based on indexing the trace log, a ranking score for each content item that is accessed by users associated with the particular role; and
providing a subset of the content items comprising a ranking score above a threshold.

29. The system of claim 22, wherein the search query is received through the portal from a mobile communication device.

* * * * *